United States Patent
Dunstan

[11] Patent Number: 5,873,547
[45] Date of Patent: Feb. 23, 1999

[54] AIRCRAFT ENGINE THRUST MOUNT

[75] Inventor: Kent W. Dunstan, Federal Way, Wash.

[73] Assignee: The Boeing Company, Seattle, Wash.

[21] Appl. No.: 859,663

[22] Filed: May 20, 1997

[51] Int. Cl.[6] .................................................. B64D 27/26
[52] U.S. Cl. ........................... 244/54; 60/39.31; 248/554
[58] Field of Search ............... 244/54; 248/554, 248/557; 60/39.31, 39.32

[56] References Cited

U.S. PATENT DOCUMENTS

| | | |
|---|---|---|
| 3,844,115 | 10/1974 | Freid . |
| 4,055,041 | 10/1977 | Adamson et al. . |
| 4,065,077 | 12/1977 | Brooks . |
| 4,603,821 | 8/1986 | White ........................................ 244/54 |
| 4,603,822 | 8/1986 | Chee ......................................... 244/54 |
| 4,717,094 | 1/1988 | Chee ......................................... 244/54 |
| 4,742,975 | 5/1988 | Pachomoff et al. ...................... 244/54 |
| 4,997,145 | 3/1991 | Hodgkinson ............................. 244/54 |
| 5,078,342 | 1/1992 | Langley et al. .......................... 244/54 |
| 5,174,525 | 12/1992 | Schilling . |
| 5,238,206 | 8/1993 | Pachomoff . |
| 5,275,357 | 1/1994 | Seelen et al. ............................ 244/54 |
| 5,277,382 | 1/1994 | Seelen et al. ............................ 244/54 |
| 5,303,880 | 4/1994 | Cencula et al. .......................... 244/54 |
| 5,320,307 | 6/1994 | Spofford et al. ......................... 244/54 |
| 5,351,930 | 10/1994 | Gwinn et al. ........................... 248/557 |
| 5,474,258 | 12/1995 | Taylor et al. . |
| 5,620,154 | 4/1997 | Hey .......................................... 244/54 |

OTHER PUBLICATIONS

777 Rolls Royce Trent 800 Aft Engine Mount.

*Primary Examiner*—William Grant
*Attorney, Agent, or Firm*—Christensen O'Connor Johnson & Kindness, PLLC

[57] ABSTRACT

A thrust mount (24) for passing thrust loads between a forward engine frame (16) and an aft engine mount upper fitting (34). The thrust mount includes first and second thrust links (46), (48) interconnected between the engine frame and an evener bar. A central clevis (30) extends forwardly from a forward surface (32) of the upper fitting (34). The central clevis (30) accepts a center portion (36) of the evener bar (38) and secures the evener bar therein using a rotatable connection mechanism (40). A pair of thrust lugs (42) also extends forwardly from the upper fitting. The central clevis is located between the opposed thrust lugs. Each thrust lug (42) includes slots (44) for receiving an evener bar end. The evener bar (38) further includes an aft surface (48) positioned near, though not normally contacting, the upper fitting forward surface (32). The rotatable connection mechanism (40) at the central clevis transfers thrust loads during normal operations. During failure conditions, the thrust lugs (42) are used to transfer thrust loads.

20 Claims, 6 Drawing Sheets

AIRCRAFT ENGINE THRUST MOUNT

FIELD OF THE INVENTION

The present invention relates to apparatus for supporting aircraft engines, and more particularly, to thrust mount apparatus for transferring axial jet engine loads to an aircraft support structure, such as a pylon or strut.

BACKGROUND OF THE INVENTION

Forward and aft engine mounts are currently used to mount an engine to an aircraft support structure, such as a wing or tail pylon. These mounts work well at carrying in-plane loads, i.e., those occurring generally in a plane extending perpendicularly outwardly from the longitudinal axis of the engine, including vertical and lateral loads and rotary torque or moments. A thrust mount is used to transfer axially-directed thrust loads of the engine to the support structure. Tension loads occur during forward thrust of the engine, and compression loads occur during braking and during use of the engine's thrust reversers. Thrust loads are commonly transferred from the engine through two thrust links connected to a portion of an aft engine mount. The thrust load is then transferred to the wing pylon through shear pins in the aft engine mount. This route from the engine to the wing is generally referred to as the total thrust load path.

It is important that thrust mounts be designed in such a way as to minimize the risk of an engine loss should the thrust mount fail. It is also important that the mount be relatively easy to manufacture, install, and maintain. At times, these aspects produce incompatible design goals that are difficult to effectively reconcile.

For example, one current thrust mount described in U.S. Pat. No. 5,320,307, uses a primary pin and two catcher pins to hold an evener beam in a thrust mount clevis. Both catcher pins are designed to engage if the primary pin fails or if a thrust link fails. The '307 design requires a wide thrust clevis in order to accept three pins in a row. Such a clevis is costly to machine since an end mill must reach a long distance into a hard material, e.g., titanium, in order to machine the open areas required to form the thrust clevis. This configuration also has the disadvantage of being inherently heavier because the required in-line bores limit the amount of weight-reducing pocketing that may be accomplished in the evener beam. The second catcher pin and the wideness of the overall clevis also add weight to this particular design.

There exists a need for a superior thrust mount capable of handling thrust loads, while at the same time having a reasonable size and weight. The mount should provide adequate load bearing capability in the event of a thrust link or pin failure and should be easy to install. The mount should also be easy to maintain and require less custom manufacturing than current designs. As will be appreciated by the following description, the present invention provides such a superior thrust mount.

SUMMARY OF THE INVENTION

In accordance with the present invention, a thrust mount is provided for carrying axial engine loads and moments to various locations on a support structure such as a wing pylon. The thrust mount is connected between an engine frame and a support structure attachment fitting. In one embodiment, the thrust mount is attached between a forward fan frame and an aft engine mount upper fitting. Thrust mounts formed in accordance with the invention can be used in various locations on an airplane (e.g., to a wing pylon, to a tail strut, etc.) as well as at various engine locations (e.g., at the forward portion of the engine or at the aft portion of the engine).

In accordance with futher aspects of this invention, a central clevis and a pair of thrust lugs extend forwardly from the aft engine mount upper fitting. The central clevis is located laterally between the thrust lugs. The thrust lugs each include a slot. The thrust mount includes an evener bar having opposed first and second ends and an aft surface facing the attachment fitting forward surface. The central clevis accepts a center portion of the evener bar, and the evener bar ends are positioned in the thrust lug slots. The evener bar is secured to the central clevis using a rotatable connection mechanism. Preferably, the central clevis includes first and second tines within which the evener bar is disposed and held therein by a primary pin inserted through primary pin holes in the tines and through an aligned primary pin hole in the evener bar. The primary pin is preferably of a diameter in the range of about 2.5 cm to about 2.6 cm.

In accordance with other aspects of this invention, the thrust mount further includes first and second thrust links each having a first end connected to the engine frame and a second end rotatably connected to the evener bar. The connection of the first thrust link to the evener bar is positioned between the evener bar first end and the evener bar connection to the central clevis. The connection of the second thrust link to the evener bar is positioned between the evener bar second end and the evener bar connection to the central clevis. The rotatable connections of the thrust link second ends to the evener bar preferably include pin-and-clevis joints.

In accordance with still further aspects of this invention, a first thrust load path exists along the first thrust link through its connection to the evener bar to the location of the central clevis. A second thrust load path exists along the second thrust link through its connection to the evener bar to the location of the central clevis. During normal operations, thrust loads are transferred between the frame and the fitting through the thrust link load paths and the evener bar rotatable connection mechanism at the central clevis. The evener bar ends do not transfer loads through the thrust lugs during normal operations. The evener bar aft surface is spaced a distance greater than 0.000 cm from the forward surface of the attachment fitting during normal operations, preferably in the range of about 0.25 cm to about 0.26 cm for one embodiment.

In accordance with still other aspects of this invention, during failure along one of the thrust link load paths, the evener bar rotates at the rotatable connection mechanism until the unfailed evener bar end contacts a surface of the thrust lug slot. Therefore, the first thrust lug carries thrust loads during failure along the second thrust load path; the second thrust lug carries thrust loads during failure along the first thrust load path. Preferably, the distance evener bar aft surface does not contact the attachment fitting during failure along either one of the first and second thrust load paths. During failure of the rotatable connection mechanism, the evener bar shifts forward so that both evener bar ends contact their respective thrust lug slot surfaces.

In accordance with yet further aspects of this invention, a pair of thrust stops are connected to the attachment fitting and extend toward the evener bar aft surface. One thrust stop is located between the rotatable connection mechanism and each thrust link connection to the evener bar. The evener bar does not contact the thrust stops during normal operations and during forward propulsion with a failed mount load path. During failure of the rotatable connection mechanism during reverse thrust, the evener bar shifts aft until the evener bar aft surface contacts the thrust stops. During failure of a thrust link load path during reverse thrust, the evener bar rotates about the rotatable connection mechanism until a portion of the unfailed evener bar aft surface contacts its respective thrust stop.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
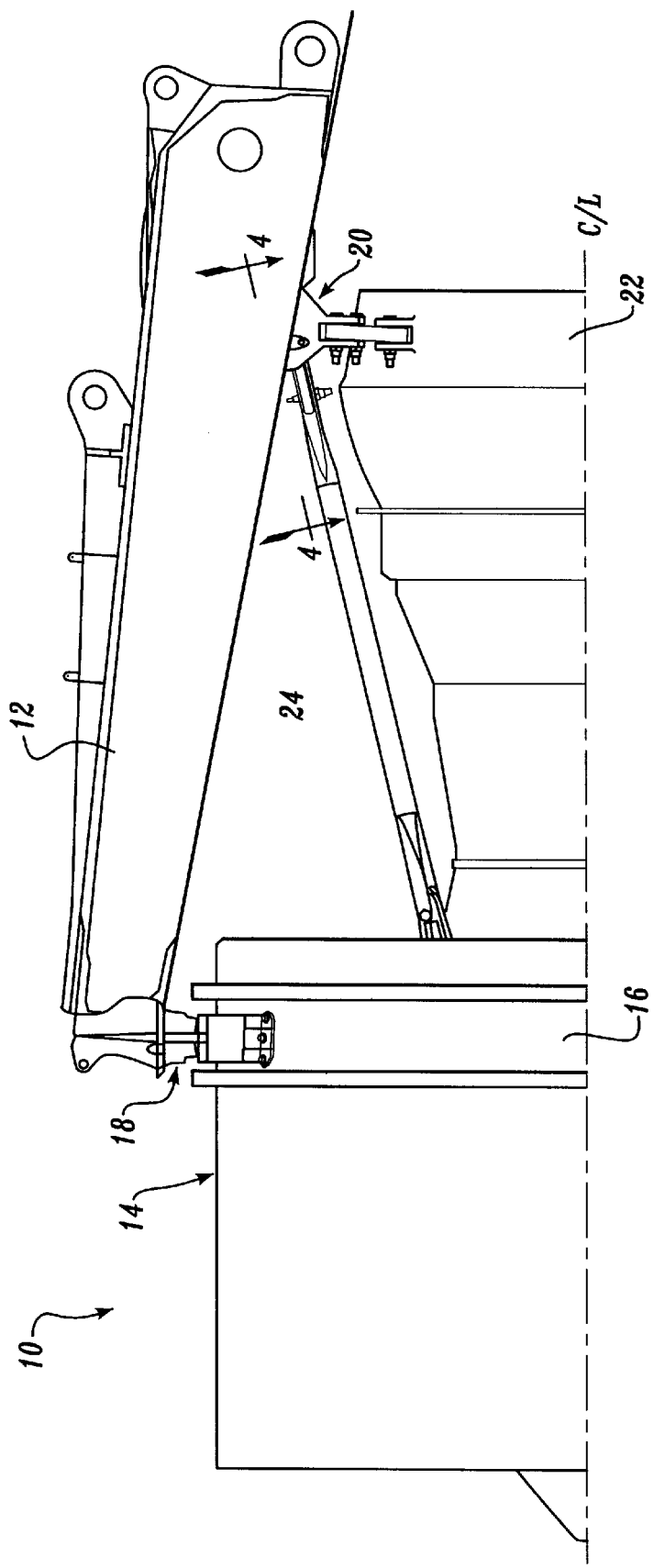
FIG. 1 is a partial side view of an exemplary aircraft engine with a thrust mount formed in accordance with the present invention attached to the engine.
Figure 2:
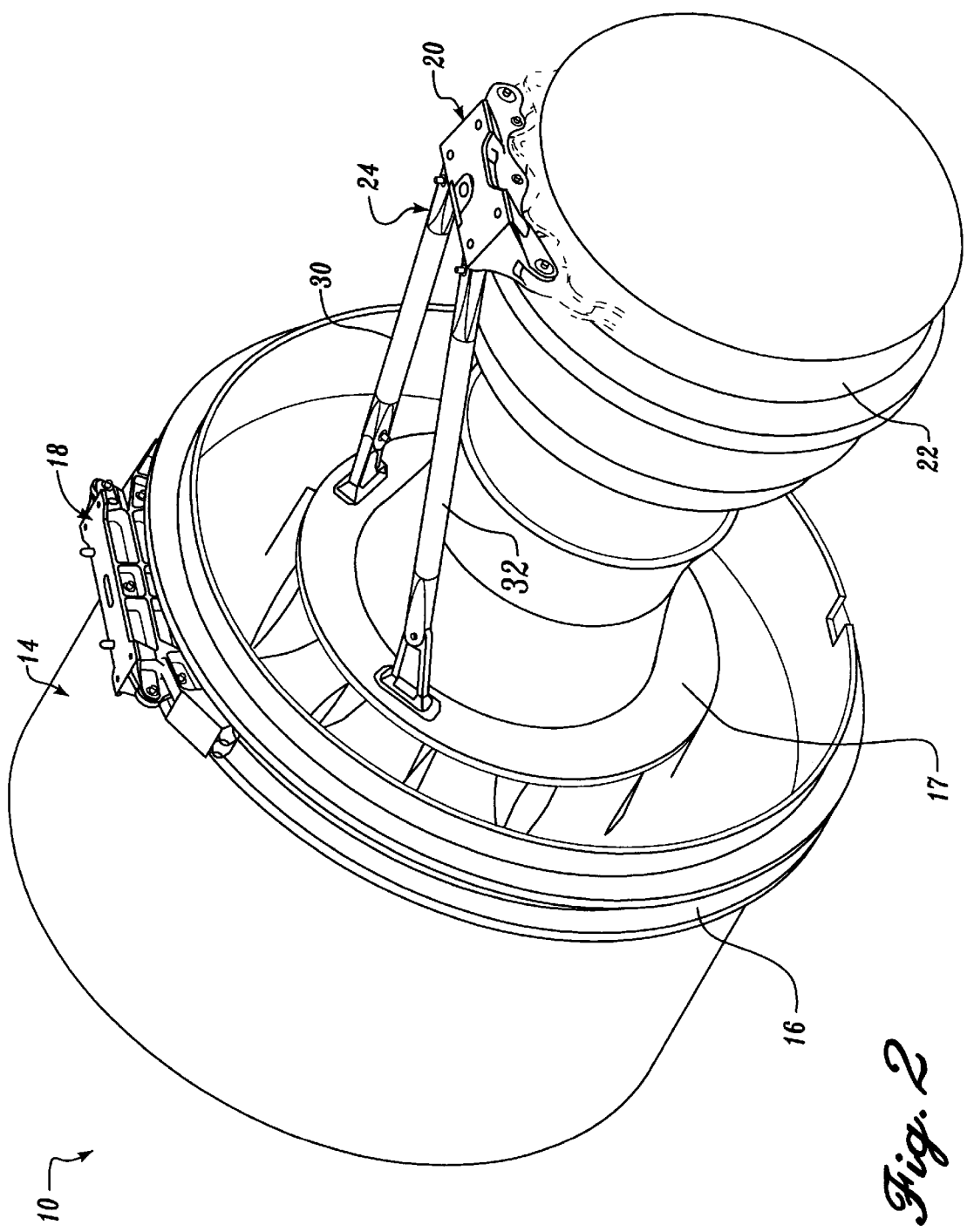
FIG. 2 is a rear perspective view of the engine and present invention thrust mount of FIG. 1.

Illustrated schematically in FIGS. 1 and 2 is an exemplary aircraft turbine jet engine 10 mounted to a support structure, such as a conventional wing pylon or strut 12. The engine 10 includes a fan 14 which is supported by a forward frame 16 fixedly joined to the engine 10 via an inner annulus 17, as shown in FIG. 2. A forward engine mount 18 attaches a portion of the forward frame 16 to a forward location of the pylon 12. An aft engine mount 20 supports a rear frame 22 fixedly joined to an aft portion of the engine 10. The forward frame 16 and the rear frame 22 are disposed generally coaxially about the centerline axis of the engine 10. A thrust mount 24 formed according to the present invention is provided for carrying axial engine forces and moments to the support structure. In the preferred embodiment, the thrust mount 24 is attached to the forward frame inner annulus 17 and the aft engine mount 20.

Figure 3:
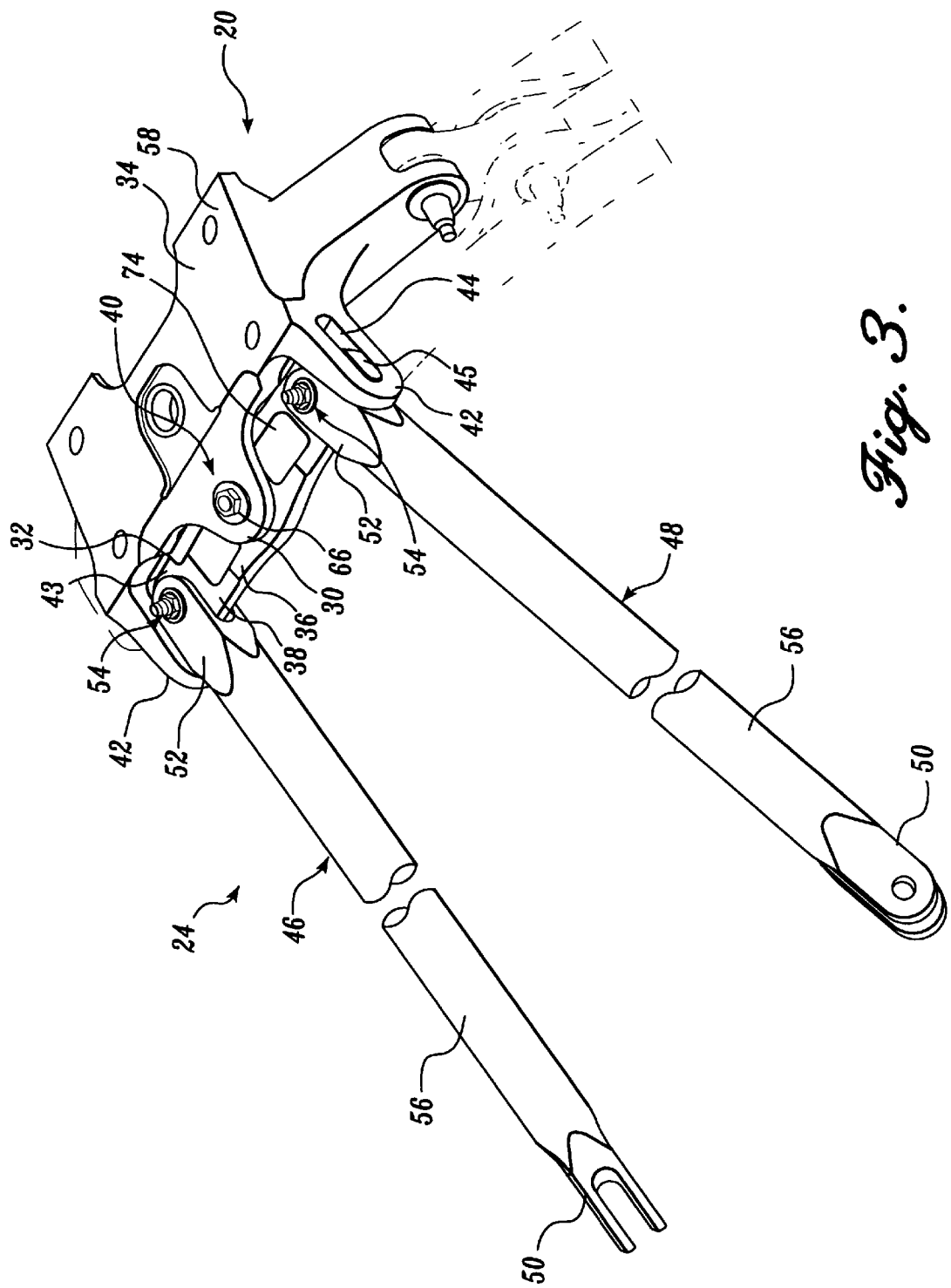
FIG. 3 is a perspective view of a thrust mount formed in accordance with the present invention with portions of an aft engine mount shown in phantom.

Shown in FIG. 3 is a perspective view of the thrust mount 24. In general, a central clevis 30 extends from a forward surface 32 of a support structure attachment fitting, such as an aft engine mount upper fitting 34. The central clevis 30 accepts a center portion 36 of an elongated evener bar 38 and secures the evener bar therein using a rotatable connection mechanism 40. The mount further includes a pair of forwardly extending thrust lugs 42, each having a slot 44 therein. First and second evener bar ends 43, 45 are disposed in the thrust lug slots 44. Conventional first and second thrust links 46, 48 are provided. Each link has a first end connected to the engine frame and a second end rotatably connected to the evener bar. Under normal operating conditions, thrust loads are passed from the thrust links to the evener bar and through the rotatable connection mechanism 40 to the upper fitting 34. During a failure condition, the evener bar moves such that loads are transmitted through the thrust lugs.

In more detail, shown in FIG. 3 each thrust link 46, 48 includes a distal end 50 pivotally joined to the inner annulus 17. The attachments of the thrust link distal ends 50 may be accomplished using any one of a number of available methods. Each thrust link 46, 48 further includes a proximal end 52 for rotatable connection to the evener bar 38. The connection of the first thrust link 46 to the evener bar is located between the evener bar first end 43 and the evener bar connection to the central clevis. The connection of the second thrust link 48 to the evener bar is located between the evener bar second end 45 and the evener bar connection to the central clevis.

The preferred connections of thrust link proximal ends 52 to evener bar 38 are pin-and-clevis joints 54 whereby each proximal end 52 is in the form of a clevis with upper and lower tines to receive the evener bar 38 between the tines. Shear pins are inserted therethrough. The axis of rotation between the thrust links and the evener bar is oriented generally normal to the longitudinal axis of the thrust links. A substantially straight tube portion 56 extends between each thrust link's proximal and distal ends. The desired tube portion thickness, diameter, and material composition are determined using current design practices and considerations well known to those skilled in the art.

Figure 4:
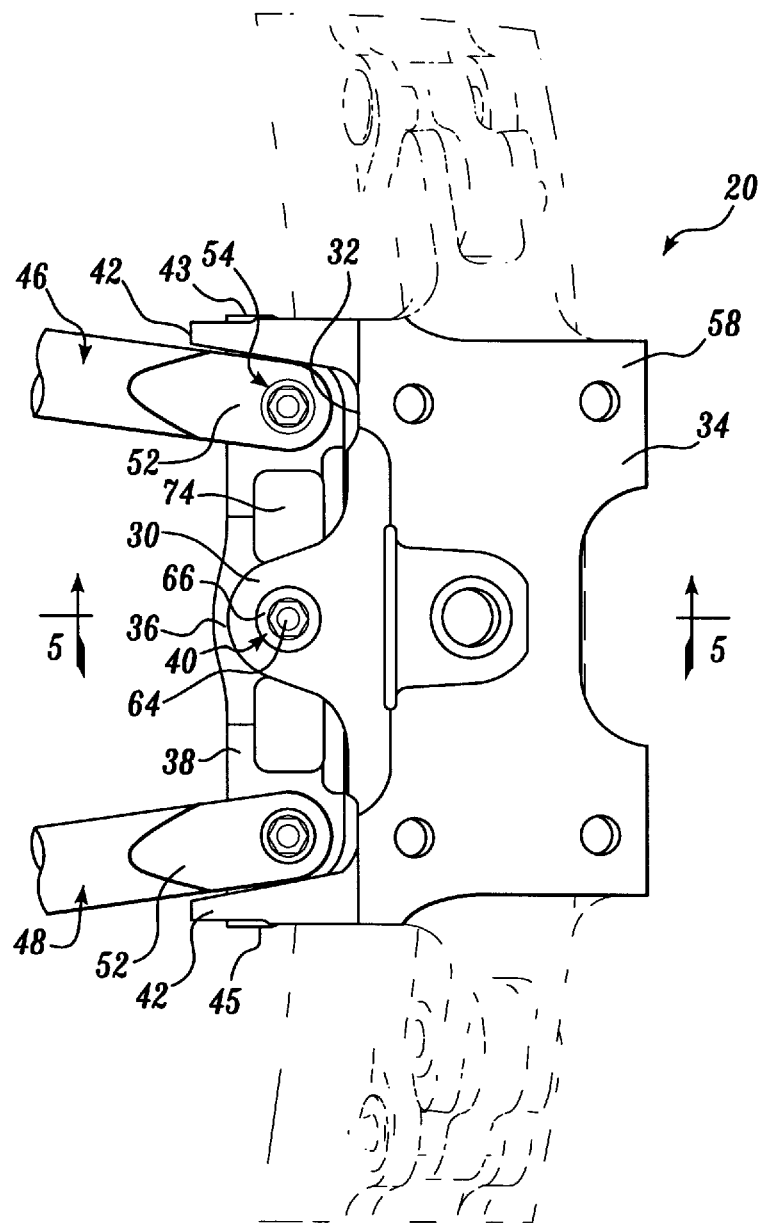
FIG. 4 is a top down view of the thrust mount of FIG. 3 with portions of an aft engine mount shown in phantom.

Referring to FIGS. 3 and 4, the upper fitting 34 includes a mounting platform 58 for attaching the aft engine mount 20 to the wing pylon 12 by conventional methods, such as using mounting bolts (not shown) extending through a number of holes in the platform 58. Referring back to FIG. 5, the central clevis 30 extends from the upper fitting 34 at a slight, downward angle. This angle is due to the location of the thrust link distal end connections with the forward annulus 17. In general, the exact orientation of the central clevis 30 will be a function of the thrust link forward connections. It is preferable that the connections of the thrust links 46, 48 to the evener bar 38, and the evener bar 38 to the central clevis 30, be substantially co-planar (such as is shown in FIG. 3.)

Figure 5:
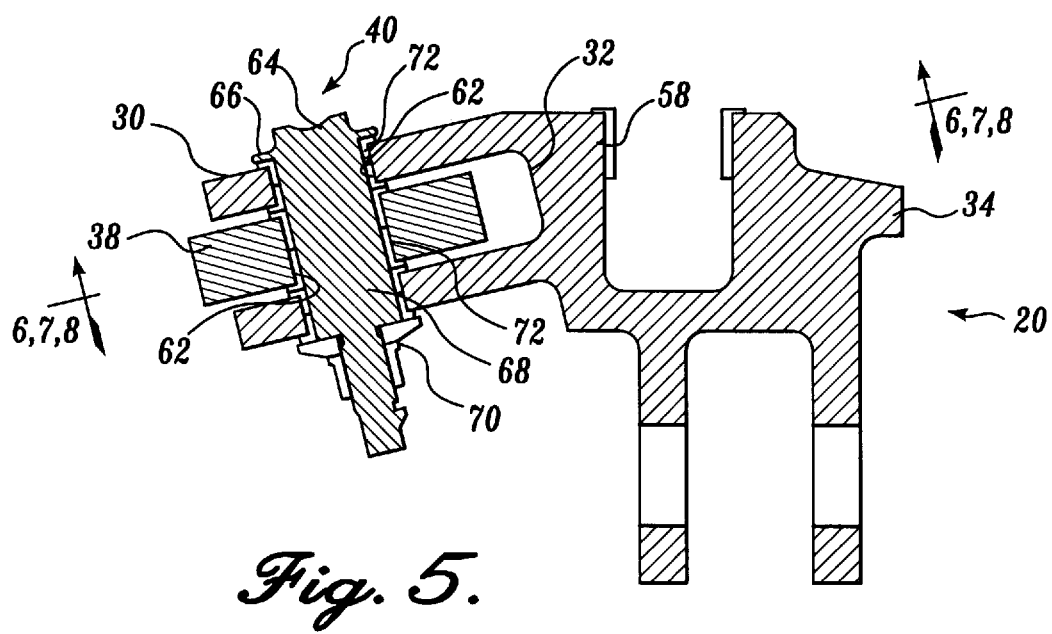
FIG. 5 is a side view along line 5—5 of FIG. 4.

Referring to FIG. 5, the rotatable connection mechanism 40 includes components located generally in the center of the central clevis. The preferred rotatable connection mechanism 40 is also a pin-and-clevis type connection. The evener bar and central clevis both include primary pin holes 62, 62' that are generally circular and are formed about an axis transverse to the plane of the evener bar 38. These holes 62, 62' are sized according to the requirements of a particular application and factors known to those skilled in the art. When the evener bar center portion is inserted between the tines of the central clevis 30, the evener bar primary pin hole 62 aligns with the central clevis primary pin holes 62'.

A primary pin 64 is inserted through the evener bar and central clevis primary pin holes 62, 62'. The primary pin 64 includes a head 66 located at one end and a threaded shank portion 68 located at the other end. When inserted in the clevis tines, the length of each pin is sufficient to allow the threaded portion 68 to extend past the tines. A nut 70 engages the threaded portion 68 to secure the pin in the clevis. Multiple bushings 72 may be used to reduce vibration and frictional wear of the evener bar and of the primary pin 64. The clevis tines, the bushings 72, the evener bar 38 and the pin are generally sized to fit closely together. The above-described primary pin arrangement is the preferred embodiment of the rotatable connection mechanism 40. The present invention, however, encompasses the use of other rotatable connection mechanisms provided they allow rotation of the evener bar relative to the central clevis.

Figure 6:
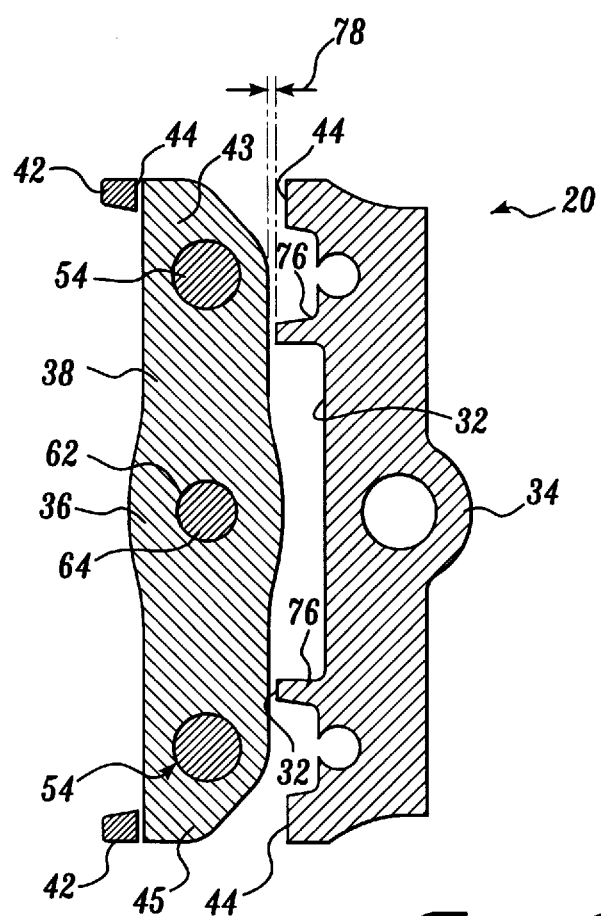
FIG. 6 is a top down schematic view along line 6—6 of FIG. 5 showing the thrust mount as positioned during normal operations.

Referring to FIGS. 3 and 6, the thrust lugs 42 also extend forward from the upper fitting forward surface 32. The thrust lug slots 44 are oriented in a generally upright longitudinal plane and are sized large enough so that the evener bar end surfaces during normal (unfailed) operations, do not contact any surface of the slots 44.

Shown best in FIG. 5, the evener bar 38 has a generally constant thickness, although a designer may vary the thickness at select locations depending on the expected design stresses. The evener bar 38 may also be formed to include structurally reinforced portions capable of providing extra load-carrying capability and bored-out portions (such as indentation 74 shown in FIG. 4) to lessen the overall weight of the thrust mount. The precise location and size of these alterations will depend on the particular application. The evener bar must be shaped and sized such that once it is connected to the upper fitting at the rotatable connection mechanism, the evener bar can pivot easily without rubbing or catching on any portion of the fitting or central clevis.

Referring to FIG. 6, the upper fitting includes one or more thrust stops 76 extending toward the evener bar 38 for use during a mount failure in reverse thrust. These stops are optional, depending on whether providing a failsafe thrust mount during reverse thrust is required. Should the thrust stops 76 be used, the preferred order of position between mount components is for the link-to-bar connections to be inboard, though near, their respective thrust lugs, with a single thrust stop located between the rotatable connection mechanism and each thrust link connection to the evener bar.

In addition, the evener bar 38 is preferably positioned to leave a slight distance 78 between the evener bar aft surface 48 and the upper fitting forward surface 32 during normal use and during a forward thrust mount failure. Otherwise, the evener bar aft surface 48 may butt against the thrust stops 76 prior to the evener bar ends contacting their respective thrust lug slot surfaces. Such a condition is not an optimal load transmitting arrangement, since the evener bar end contacting the stop may be along the failed load path and hence potentially structurally compromised.

The preferred distance 78 from the evener bar aft surface 48 to the thrust stops 76 is preferably in the range of about 0.2 cm to 0.3 cm. A distance of about 0.25 cm has been found to work well for one embodiment designed for use with a CFMI 56-7 engine. To form a compact and efficient thrust mount, a designer should plan to use the smallest distance possible considering various factors, e.g., manufacturing tolerances, load deflections, thermal deflections, etc.

Referring to FIG. 6, during normal operations, thrust loads are transferred from the engine frame or fan annulus 17 to the thrusts links 46, 48, then to the evener bar 38, and finally to the upper fitting 34 via the rotatable connection mechanism 40. A first thrust load path exists along the first thrust link through its connection to the evener bar to the location of the central clevis, and a second thrust load path exists along the second thrust link through its connection to the evener bar to the location of the central clevis.

Thrust loads may be directed either forwardly, as during propulsive operation of the engine, which places the thrust links 46, 48 in tension; or the thrust loads may be directed aftward, as upon deployment of the conventional thrust reversers of the engine, which places the thrust links 46, 48 in compression. During normal operations, the substantial equality of loads stemming from the thrust links 46, 48 to the evener bar 38 ensures the distance 78 between the evener bar aft surface 48 and the upper fitting forward surface 32 and/or thrust stops. This arrangement allows the load path to pass to the upper fitting entirely through the rotatable connection mechanism 40. During normal operations, the evener bar aft surface 48 does not contact the upper fitting forward surface 32, nor do the thrust lugs 42 carry any loads.

Figure 7:
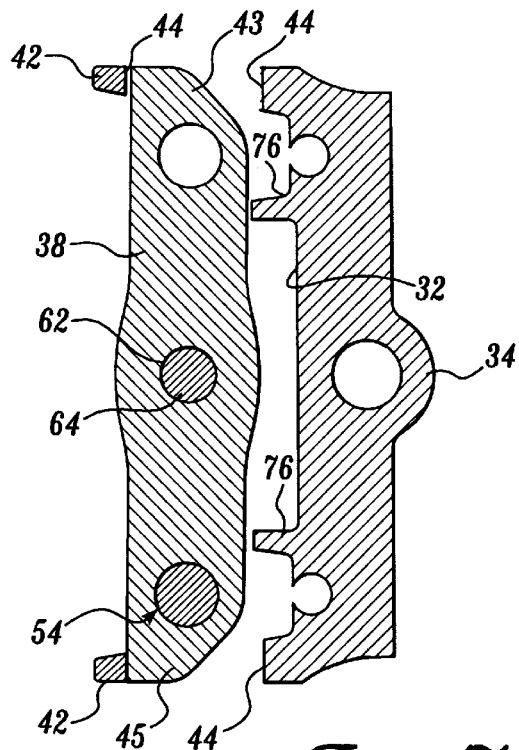
FIG. 7 is a top down schematic view of the thrust mount of FIG. 6 as positioned during a failure along a thrust link load path.

Referring to FIG. 7, during a failure of any component along either the first or second thrust load paths, the evener bar 38 will rotate slightly about the rotatable connection mechanism 40 until the unfailed evener bar end contacts the surfaces of its respective thrust lug slot 44. In FIG. 7, the first thrust link 46 has failed causing the evener bar second end to contact the second thrust lug slot. During failure of the first or second thrust load path, it is preferred that the evener bar aft surface does not contact the thrust stop 76 or other upper fitting forward surface 32. Thrust loads are thereby transmitted to the upper fitting 34 via the rotatable connection mechanism 40 and the thrust lug slot contact point.

Figure 8:
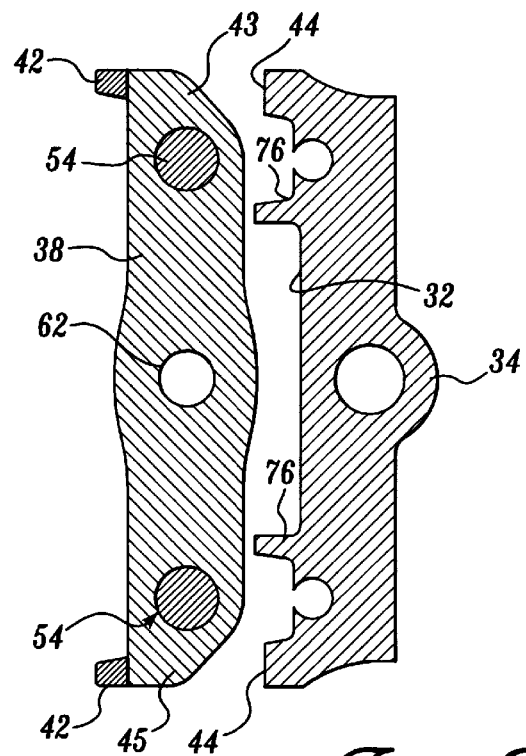
FIG. 8 is a top down schematic view of the thrust mount of FIG. 6 as positioned during a failure of a central clevis or rotatable connection mechanism.

Referring to FIG. 8, during a failure of the rotatable connection mechanism 40 (such as at the primary pin 64 or central clevis), the entire evener bar will shift forward until both evener bar end protrusions engage in their respective thrust lug slots 44. The aft surface 48 of the evener bar does not contact the upper fitting forward surface 32 since loads through the thrust links 46, 48 remain balanced.

During reverse thrust conditions (not shown), failure of a thrust link load path causes the evener bar to rotate about the rotatable connection mechanism 40 until the evener bar aft surface at the unfailed evener bar end contacts its nearest reverse thrust stop 76. Failure of the rotatable connection mechanism 40 causes the entire evener bar to shift aft until its aft surface bears against both stops.

As will be appreciated by those skilled in the art, the thrust mount of the present invention helps keep the engine attached to the airplane even during failure at any single point along the thrust mount load path, including failure at one of the thrust links, one of the link-to-mount connections, the evener bar, or the thrust mount central clevis. Locating the thrust lugs outboard of the thrust links places them in an area on the evener bar where there are no bending stresses for intact conditions. For failure conditions, the location of the evener bar ends in the thrust lug slots has a mechanical advantage, since the arrangement minimizes the reaction at the thrust lugs.

This new design has several advantages over previous thrust mount concepts. Specifically, the present invention uses fewer parts and the overall width of the thrust mount is more compact. The device is lighter in weight and utilizes a generous load couple to minimize stress in failure modes. The aft engine mount upper fitting has no unloaded catcher devises to wear unnecessarily. The thrust clevis can be extended forward efficiently to gain more space between the clevis and the strut, if necessary. The narrow thrust clevis on the aft mount minimizes the amount of difficult machining of metal required for producing the mount. This is both a savings in cost as well as in weight.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A thrust mount for supporting a jet engine having a frame and an engine support structure attachment fitting, the thrust mount comprising:
   (a) a central clevis and a pair of opposed thrust lugs both extending from a forward surface of the attachment fitting, the central clevis being located between the opposed thrust lugs, each thrust lug including slots;
   (b) an evener bar including first and second ends positionable in the thrust lug slots, each of said ends including a forward surface facing an end surface of a respective thrust lug slot, and an aft surface facing the attachment fitting forward surface; the evener bar being rotatably connected to the central clevis; and
   (c) first and second thrust links each having a first end connected to the engine frame and a second end rotatably connected to the evener bar; the connection of the first thrust link to the evener bar being positioned between the evener bar first end and the evener bar connection to the central clevis; the connection of the second thrust link to the evener bar being positioned between the evener bar second end and the evener bar connection to the central clevis;
   (d) wherein the evener bar rotatable connection to the central clevis transfers thrust loads between the frame and the attachment fitting during normal operations, a first thrust load path existing along the first thrust link through its connection to the evener bar to the location of the central clevis, a second thrust load path existing along the second thrust link through its connection to the evener bar to the location of the central clevis.

2. A thrust mount formed according to claim 1, wherein the rotatable connection of the evener bar to the central clevis includes a cylindrical primary pin having a diameter in the range of about 2.5 cm to about 2.6 cm.

3. A thrust mount according to claim 1, wherein the evener bar ends to not transfers loads through the thrust lugs during normal operations.

4. A thrust mount according to claim 1, wherein the evener bar aft surface is spaced from the attachment fitting during normal operations.

5. A thrust mount according to claim 4, wherein the distance between the evener bar aft surface and the attachment fitting forward surface remains during failure along one of the first and second thrust load paths.

6. A thrust mount according to claim 1, wherein the evener bar shifts forward during failure of the rotatable connection of the evener bar to the central clevis such that the evener bar ends contact their respective thrust lug slot surfaces.

7. A thrust mount according to claim 1, wherein the first thrust lug is arranged such that it carries thrust loads during failure along the second thrust load path.

8. A thrust mount according to claim 7, wherein the first thrust lug carries thrust loads by rotation of the evener bar about its rotatable connection to the central clevis until the first evener bar end contacts the end surface of the first thrust lug slot.

9. A thrust mount according to claim 1, wherein the second thrust lug is arranged such that it carries thrust loads during failure along the first thrust load path.

10. A thrust mount according to claim 9, wherein the second thrust lug carries thrust loads by rotation of the evener bar about its rotatable connection to the central clevis until the second evener bar end contacts the end surface of the second thrust lug slot.

11. A thrust mount according to claim 1, further comprising a pair of thrust stops connected to the attachment fitting and extending toward the evener bar aft surface.

12. A thrust mount according to claim 11, wherein the distance between the evener bar aft surface and the thrust stops is in the range of about 0.25 cm to about 0.26 cm during normal operations.

13. A thrust mount according to claim 11, wherein the evener bar is located a spaced distance from the thrust stops during normal operations and during forward propulsion with a failed mount load path; and wherein the evener bar is arranged such that it contacts the thrust stops during reverse propulsion with a failed mount load path.

14. A thrust mount according to claim 11, wherein one thrust stop is located between the rotatable connection mechanism and each thrust link connection to the evener bar.

15. A thrust. mount according to claim 1, wherein the engine support structure attachment fitting is an upper fitting of an aft engine mount.

16. A thrust mount for supporting a jet engine having a frame and an engine support structure attachment fitting, the thrust mount comprising:
   (a) a central clevis and a pair of opposed thrust lugs extending from a forward surface of the attachment fitting, the central clevis including a rotatable connecting mechanism have first and second tines and a primary pin hole extending through both tines, the central clevis being located on the attachment fitting between the opposed thrust lugs, each thrust lug including slots;
   (b) a transversely extending evener bar including first and second ends positionable in the thrust lug slots, each of said ends including a forward surface facing an end surface of a respective thrust lug slot, and an aft surface facing a forward surface of the attachment fitting; the evener bar being disposed between the clevis rotatable connection mechanism first and second tines and held therein by a primary pin passing through the tine primary pin holes and an aligned evener bar primary pin hole; and
   (c) first and second thrust links each having a first end connected to the engine frame and a second end rotatably connected to the evener bar; the connection of the first thrust link to the evener bar being positioned between the evener bar first end and the evener bar connection to the central clevis; the connection of the second thrust link to the evener bar being positioned between the evener bar second end and the evener bar connection to the central clevis;
   (d) wherein the evener bar rotatable connection to the central clevis transfers thrust loads between the frame and the attachment fitting during normal operations.

17. A thrust mount according to claim 16, wherein the evener bar shifts aft during failure of the rotatable connection of the evener bar to the central clevis during reverse thrust until the evener bar aft surface contacts the attachment fitting.

18. A thrust mount according to claim 16, wherein the evener bar rotates about the rotatable connection mechanism during failure of a thrust link load path until a portion of the evener bar aft surface contacts the attachment fitting.

19. A thrust mount according to claim 16, further comprising a pair of thrust stops connected to the attachment fitting and extending toward the evener bar aft surface, one thrust stop being located between the rotatable connection mechanism and each thrust link connection to the evener bar.

20. A thrust mount according to claim 19, wherein the evener bar is located a spaced distance from the thrust stops during normal operations and during forward propulsion with a failed mount load path; and the evener bar is arranged such that it contacts the thrust stops during reverse propulsion with a failed mount load path.

* * * * *

UNITED STATES PATENT AND TRADEMARK OFFICE
CERTIFICATE OF CORRECTION

PATENT NO. : 5,873,547
DATED : February 23, 1999
INVENTOR(S) : K.W. Dunstan

It is certified that error appears in the above-indentified patent and that said Letters Patent is hereby corrected as shown below:

| COLUMN | LINE | |
|---|---|---|
| [56] | Refs. Cited (U.S. Patent Docs.) | Please insert the following references:<br>--4,634,081  1/1987  Chee . . . . . 244/54<br>5,649,417  7/1997  Hey . . . . . . 60/39.31<br>5,725,181  3/1998  Hey . . . . . . 244/54-- |
| 7 (Claim 3, | 36 line 2) | "bar ends to not transfers loads" should read --bar ends do not transfer loads-- |
| 8 (Claim 15, | 12 line 1) | After "thrust" delete "." |
| 8 (Claim 16, | 21 line 7) | "have" should read --having-- |

Signed and Sealed this

Tenth Day of August, 1999

Attest:

Q. TODD DICKINSON

*Attesting Officer*      Acting Commissioner of Patents and Trademarks